(12) United States Patent
Yonenoi

(10) Patent No.: US 7,232,119 B2
(45) Date of Patent: Jun. 19, 2007

(54) VICE FOR TYING A HOOK FOR FLY-FISHING

(76) Inventor: Kimio Yonenoi, Bias Ichiago B-117, No. 5-1, Souda Nishi 5-Chrome, Aoba-ku 225-0014, Yokohama-Shi, Kanagawa-Ken (JP)

( * ) Notice: Subject to any disclaimer, the term of this patent is extended or adjusted under 35 U.S.C. 154(b) by 0 days.

(21) Appl. No.: 11/103,385

(22) Filed: Apr. 11, 2005

(65) Prior Publication Data
US 2006/0226589 A1 Oct. 12, 2006

(51) Int. Cl.
*B25B 1/22* (2006.01)
(52) U.S. Cl. .......................................... 269/71; 269/907
(58) Field of Classification Search .................. 269/69, 269/71, 907, 95, 97, 98, 166, 229, 234; 279/41 R; 294/100; 81/6, 7, 8; 43/1; 242/7.01
See application file for complete search history.

(56) References Cited
U.S. PATENT DOCUMENTS
2,786,434 A * 3/1957 Klungtvedt .................. 269/60
5,169,079 A * 12/1992 Renzetti ..................... 242/446

FOREIGN PATENT DOCUMENTS
JP A- 2001-112394 4/2001

* cited by examiner

*Primary Examiner*—Robert C. Watson

(57) ABSTRACT

A vice for fly tying comprises a support disposed adjustably on a suitable base plate, a maintaining base attached on the support and provided with a fastening screw on its side surface, a revolving knob connected with the maintaining base at its rear end, a revolving base rotatively connected with the maintaining base at its rear end, through a through hole of the later by an axle bar of the revolving knob, and a holding member pivotally connected with the revolving base, through two pairs of movable connecting plates attached to both sides of the later and a connecting axle bar attached on its rear end portion. The holding member comprises an axial holding piece made of a magnetic inductive material and a movable holding piece, and is provided with a pair of adjusting screws at its rear portion and front portion, a magnet on an inner surface of the former piece, a spring held between the both inner surfaces of both pieces and a rubber ring wound centrally on both pieces, so that the fly hook can be exactly held between the both pieces of the jaw portion for fly tying.

18 Claims, 4 Drawing Sheets

VICE FOR TYING A HOOK FOR FLY-FISHING

BACKGROUND OF THE INVENTION

This invention relates to a vice for tying a hook, particularly a fly used in fishing. More particularly the invention relates to a vice for tying a fly for fly-fishing, which can be easily centered on a hook in a manufacturing process of the fly, by inducing a magnetic field on an end portion of the vice, a so-called jaw portion, to set magnetically the fly hook into the jaw.

Customarily, a fly for fly fishing is manufactured by holding on a tying vice firstly the fly hook and thereafter, tying on the fly hook a material such as a bird feather or animal hair together with a thread, to make a suspected bait, which is alike to an aquatic insect.

In such manufacture of the fly, various vices have been proposed, such as in Published Japanese Patent Application Kokai 2001-112394. The vice is provided with a jaw on its extreme end portion which comprises a pair of holding portions, having double joint surfaces and differently sized multiple grooves on their surfaces, so that differently sized multiple hooks can be held in one of those grooves.

In this fly tying, generally the vice showed reasonable function, however, it has inconveniences and practical defects as follows.

Firstly, all fly hooks, which is respectively of different sizes and different forms, can not be held exactly with the vice, due to limitation of their width and length, even though differential sized multiple grooves are provided with either a pair of relative holding surfaces of the vice. If those hooks are held with the vice without any considerations, they may be damaged or broken away because unreasonable relations appear forcibly between the hooks and grooves respectively.

Secondly, an opening and closing operation of such a pair of holding surfaces is adjusted by sliding the holding member combined to the vice with an operation lever, so that the fly hook has to be fixed by moving the operation lever with one hand, and gripping the fly hook, by the other hand. Accordingly, it is very difficult to hold the fly hook at the proper position and in the proper direction, even if by the expert, to say nothing of the beginner, without a careful operation.

The vice can not also be regarded as a functional tying device because it can not execute a detailed fly tying operation, due to lack of a centering means for holding temporarily the hook and fixedly in the jaw.

BRIEF DESCRIPTION OF THE INVENTION

In an embodiment of the present invention, a vice for fly tying comprises a maintaining base supported by a movable support through an axle tube on a suitable base. The base is provided with a revolving knob at its rear portion and a revolving base at a front portion, which is respectively connected rotationally by an axle bar, through the maintaining base, the revolving base connecting with a holding member, through two pairs of pivotal connecting plates and a connecting axle bar. The holding member comprises an axle holding piece made of a magnetic inductive material, a movable holding piece and a pair of adjusting screws for adjusting a space between the both piece surfaces, a magnet on an inside surface of the axle holding pieces a coil spring in a pair of faced recesses on each inside surface of the both pieces, and a rubber ring between the pair of screws.

In another embodiment of the present invention a vice for fly tying comprises means for connecting for the revolving base and the holding member, and comprises two pairs of pivotal connecting plates connected with the former and a connecting axle bar connected with the later.

In another embodiment of the present invention a vice for fly tying comprises a pair of magnets, a coil spring, the magnet having the same pole surface buried on both holding surfaces of the axle holding piece and the movable holding piece, to repel each other.

In a further another embodiment of the present invention a vice for fly tying comprises a pin hole prepared at an extreme portion of the revolving base so that centering of the fly hook can be easily done and exactly to make a fly.

In further another embodiment of the present invention a vice for fly tying comprises a holding coil prepared on both sides of the revolving base for provisional fixing of materials or a thread for the fly tying.

BRIEF DESCRIPTION OF THE DRAWINGS

The embodiments of the invention will be better understood by the following description and the accompanying drawings in which.

DETAILED DESCRIPTION OF THE INVENTION

Figure 1:
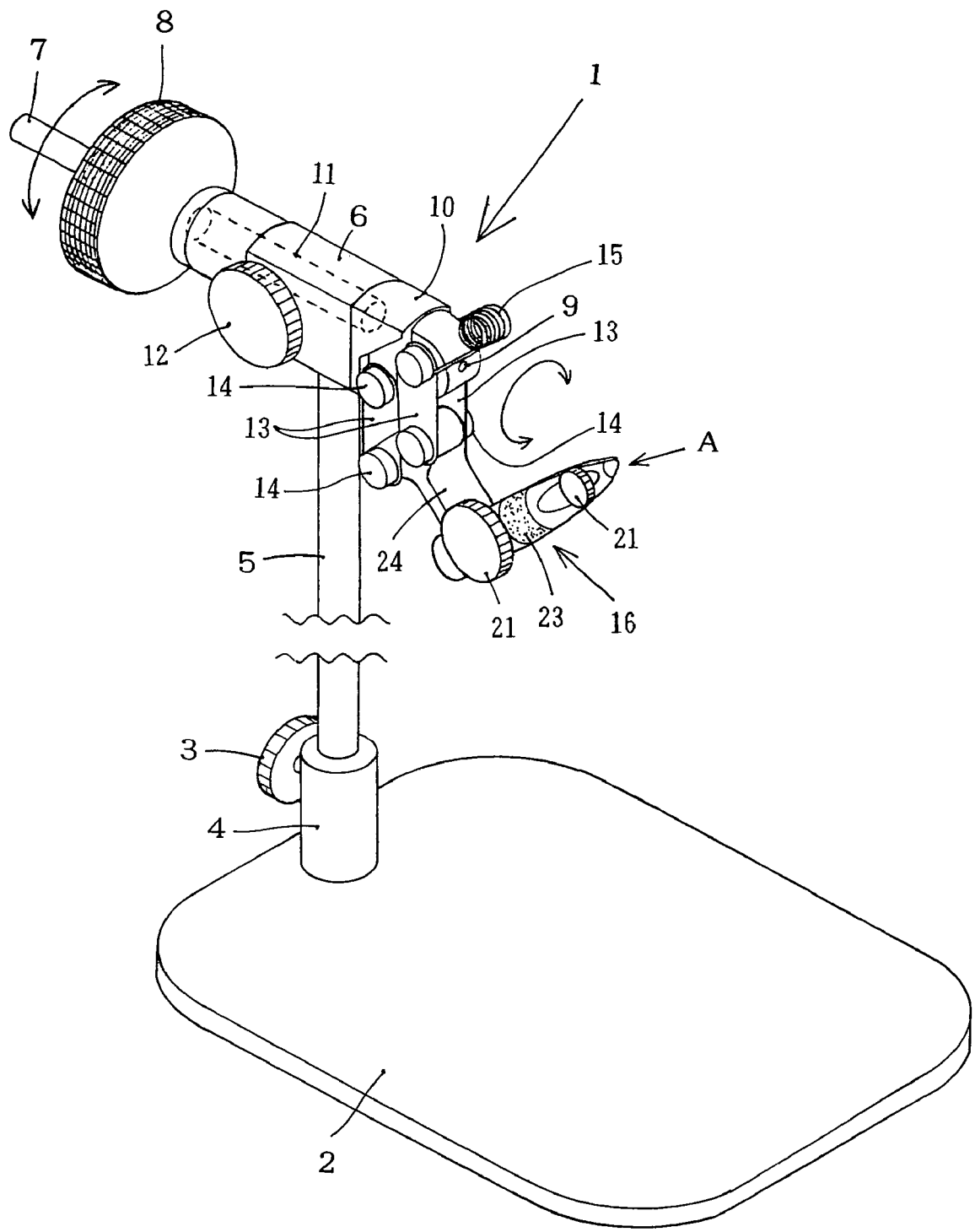
FIG. 1 is a perspective view of a tying vice for an embodiment of the present invention.
Figure 2:
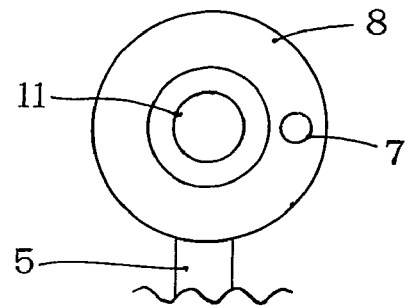
FIG. 2 is a front view of a revolving knob for a tying vice for an embodiment of the present invention.

A tying vice 1 for the present invention, as shown FIG. 1, comprises a base 2 having a suitable area and weight; an axle tube 4 attached at a rear end of the base and provided with a tightening screw 3; a maintaining base 6 having a through hole therein and set at an upper end portion of a support 5 connected adjustably into the axle tube 4; a revolving knob 8 having a secondary knob 7 fixedly connected with the maintaining base 6 in its hole by an axle bar 11 and an adjustable screw 12; a revolving base 10 set at a front end of the maintaining base 6 through the axle bar 11 and providing a pin hole 9 on its front extreme portion; and a movable holding member 16 connected with the revolving base 10 through two pairs of movable connecting plates 13 and a connecting axle bar 24 to revolve about an arrow f.

The movable connecting plates 13 are also attached pivotally to both sides of the revolving base 10 by upper screw set 14 at their one end portion, with a holding coil 15, for using as a temporary holding fixture for a thread or materials during the fly tying, and the lower screw set 14, to the one end of the connecting axle bar 24, respectively.

Figure 3:
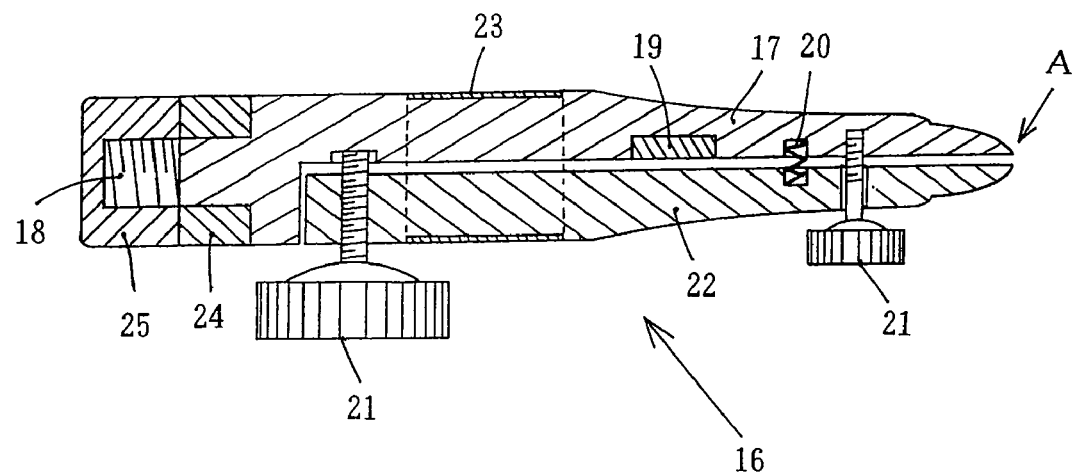
FIG. 3 is an elongated sectional plan view of a holding member for a tying vice for an embodiment of the invention.

The holding member 16 connected with the revolving base 10 through the movable connecting plates 13, as described above, comprises an axle holding piece 17 and a movable holding piece 22, as shown in FIG. 3.

The axle holding piece 17 is provided with a bolt 18 at its rear end, a magnet 19, in a recess of its inside holding surface, being near its center, and a coil spring 20, in a recess at front side of the magnet 19 on the same inside holding surface.

The movable holding piece 22 combined with the axle holding piece 17, is provided with a front adjusting screw 21 which is screwed into the latter through a through hole at a front portion of the former, and a rear adjusting screw 21a which is also screwed into the former through a screw hole at its rear portion.

The combined both pieces 22 and 17, namely the movable holding member 16, is provided with a rubber ring 23 at a central portion thereof, so that both pieces are combined firmly, and the bolt 18 at an extreme end portion of the combined axle holding piece 17 to fixedly connect by a fixing cap 25 with one end of the connecting bar 24 of which its other end is also connected movably with the revolving base 10, through the movable connecting plates 13, as mentioned above.

In operation the tying vice 1, firstly the revolving knob 8 is turned toward a desired direction to turn the revolving base 10 in the same direction, and the holding member 16 that is connected with the revolving base 10, is turned consequently toward the same direction also by the revolving knob 8.

Figure 4:
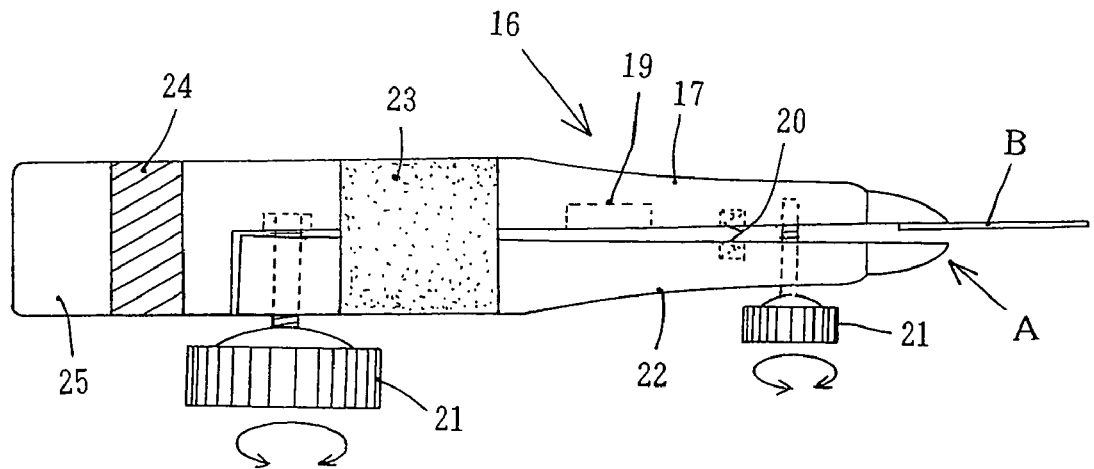
FIG. 4 is an elongated plan view showing usage of the holding member for a tying vice for an embodiment of the present invention.

The axle holding piece 17 of the holding member 16, made of a magnetic inductive material provides with the magnet 19 an extreme end portion, namely jaw A, can easily hold temporarily, even a very small fly hook B, which is very difficult to fixedly hold, as shown in FIG. 4, and such fly hook can be easily fixedly held, after suitable correction of its position and direction in the jaw.

The holding member 16, combined with the axle holding piece 17 and the movable holding piece 22, has a wound rubber ring 23 at rear central potion, and attached two adjusting screws 21 and 21a at a front and rear portion of the rubber ring 23, for opening and closing of the jaw. The fly hook B can be held fixedly under an uniform pressure of the rubber ring 23, for opening and closing of the jaw, by a tightening condition of the adjusting screws 21 and 21a, which makes the rubber ring 23 act as a fulcrum, according to each size and each form of the fly hooks B to be held fixedly in the jaw A.

Figure 5:
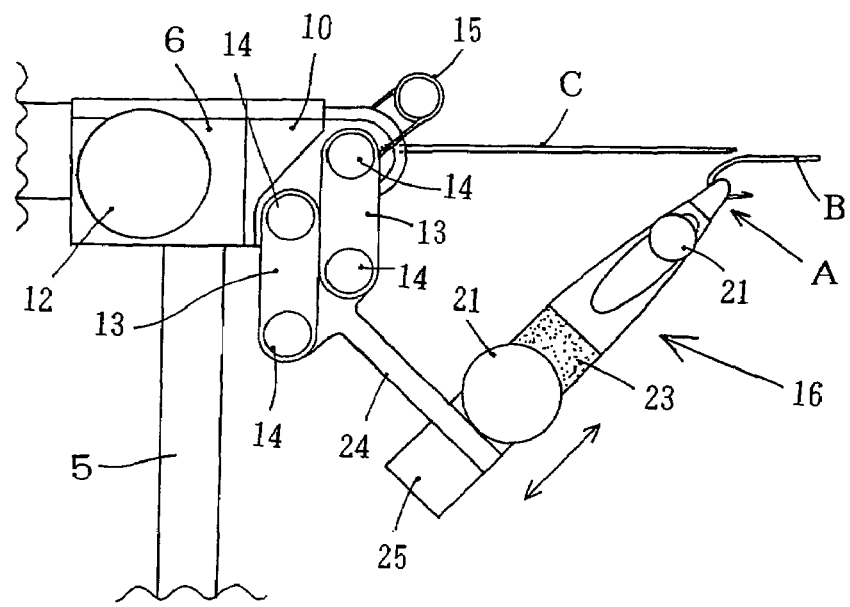
FIG. 5 is a reference drawing showing a centering of a fly for tying vice for an embodiment of the present invention.

Additionally, the centering of the fly hook B can be easily done by attaching a centering pin C into the pin hole 9 at the front portion of the revolving base 10, as shown in FIG. 5.

Figure 6:
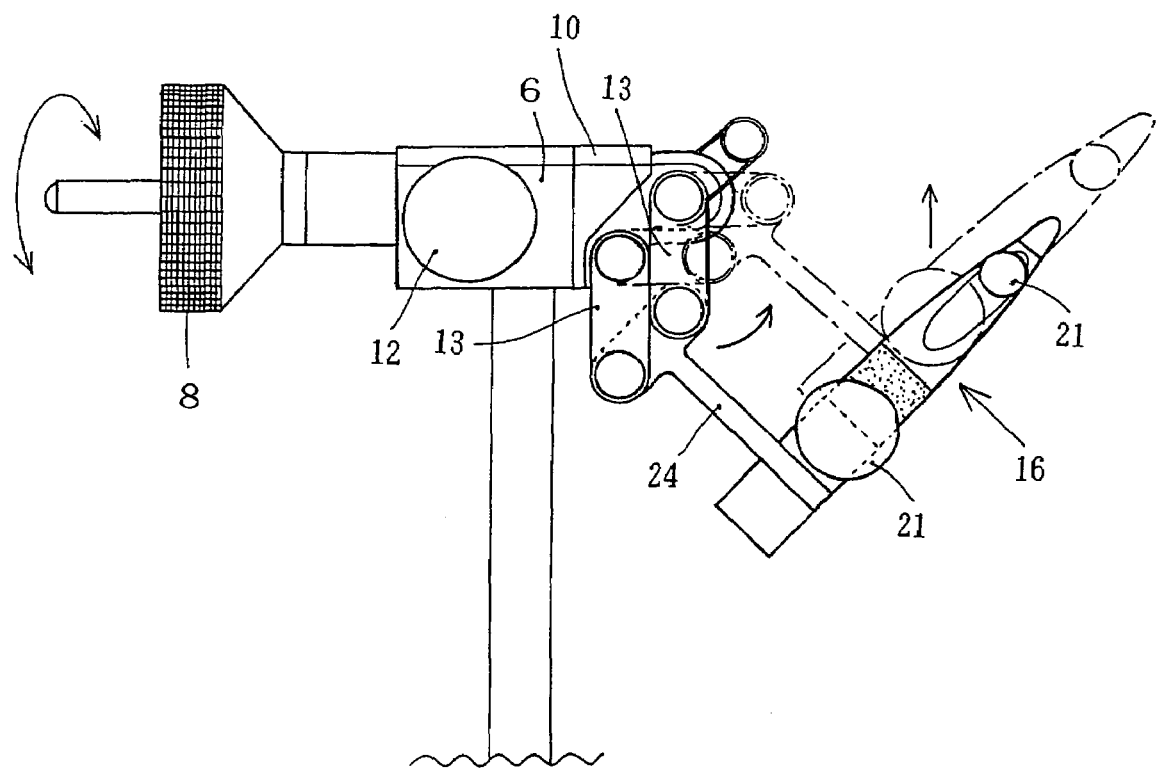
FIG. 6 is a reference drawing showing a linkage of the holding member with a revolving base for an embodiment of the present invention.

Further, the holding member 16 can be quickly and easily moved up and down, and parallel, as shown in FIG. 6, due to the connection of the revolving base 10 and the holding member 16, which is connected pivotally with two pairs of the movable connecting plates 13 and the connecting axle bar 24.

Figure 7:
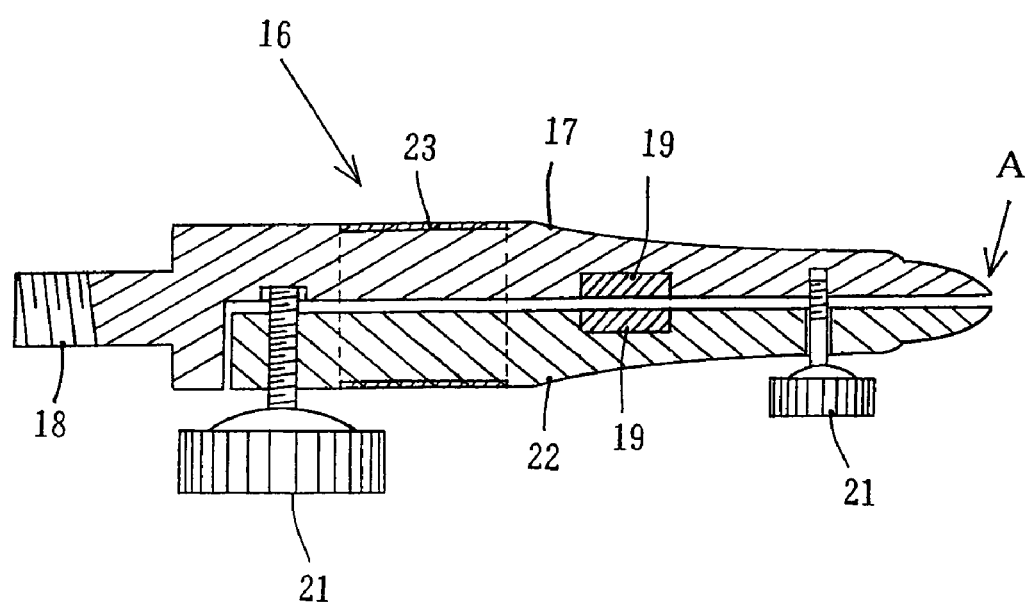
FIG. 7 is an elongated sectional plan view showing a holding member in an embodiment of the present invention.

Another embodiment is shown in FIG. 7 as a cross sectional view and shall be explained hereunder, referring the above sectional view. The extreme end portion, namely jaw A of the holding member 16 in the embodiment of FIG. 1, is opened by the coil spring 20 located between the holding surfaces of the axle holding piece 17 and the movable holding piece 22. In FIG. 7, however, the holding member 15 in is constructed such that the jaw A is opened by repellence between each same pole N and N or S and S of the two magnets 19, which respectively faced each other in a recess on the holding surface of the axle holding piece 17 and the movable holding piece 22.

The jaw A of the holding member 16 can be magnetized the same as in the embodiment of FIG. 1 and it can be opened by the repellence of the two magnets 19 attached respectively on each holding surface of the axle holding piece 17 and the movable holding piece 22, even if both surfaces are not provided with a coil spring therebetween as in FIG. 4.

The holding member 16 is provided with the magnet 19 on the axle holding piece 17, which is a magnetic inductive material, while the holding member itself may be made of the magnet also, but those materials should not be limited in this invention.

Thus, the present fly tying vice 1 can magnetically fix the fly hook B, on a desired provisional position and direction, prior to its regular setting by magnetization of the jaw A portion from the magnet 19 placed on the holding surface of the magnetic inductive material, such as the axle holding piece 17.

Accordingly, even a beginner or inexperienced worker can fix easily and exactly the fly hook on the holding surface in the case of a very fine fly hook, because it is not necessary to be picked up between the fingers, at its regular setting.

Further, the fly hook B would not be damaged in its manufacture with the vice of the present embodiments because it can be set magnetically, as it is, and can be tightened delicately under a suitable pressure, in spite of its size and form, due to the two adjusting screws 21 and 21a, as a fixing means on the holding member 16.

The holding member 16 has very unique and functional properties because the opening and closing of the jaw A can be performed easily and smoothly also by repellence of the coil spring 20 or same pole surfaces of the magnets 19, prepared between the two holding surfaces.

Additionally, the jaw A can be linked at a constant angle during the operation, because the holding member 16 and the maintaining base 6 are connected in a form of a link mechanism, which is pivoted movably by the two pairs of the movable connecting plates 13 at both sides of the revolving base 10 and the connecting axle bar 24.

Accordingly, the fly hook B fixed between the jaw A can be moved quickly to an ideal place for the adjustment without any complex operation, because the latter can be removed in parallel, without any changing of an angle of the former fixed between the later, and the former also can be easily set on a center of the axis of the jaw.

Furthermore, the centering of the fly hook B can be easily done, even by the beginner to a center line of the axis of the vice because a centering pin C can be set into a pin hole on the revolving base 10.

In addition, while an embodiment of the invention has been described with reference to exemplary embodiments, it will be understood by those skilled in the art that various changes may be made in the function and/or way and/or result and equivalents may be substituted for elements thereof without departing from the scope and extent of the invention. In addition, many modifications may be made to adapt a particular situation or material to the teachings of the invention without departing from the essential scope thereof. Therefore, it is intended that the invention not be limited to a particular embodiment disclosed for carrying out this invention, but that the invention will include all embodiments falling within the scope of the appended claims. Moreover, the use of the terms first, second, etc. or steps do not denote any order or importance, but rather the terms first, second, etc. or steps are used to distinguish one element or feature from another. Furthermore, the use of the terms a, an, etc. do not denote a limitation of quantity, but rather denote the presence of at least one of the referenced element or feature.

What is claimed is:

1. A vice for fly tying comprising:
   a maintaining base supported on an upper end of a support attached on a base, the support being vertically adjustable with respect to the base;
   a revolving knob attached rotatively at a rear end of the maintaining base;
   a secondary knob provided rotatively at the rear end of the maintaining base;
   a revolving base attached rotatively at a front end of the maintaining base and connected with the revolving knob, through a hole in the maintaining base and by an axle bar of the revolving knob;
   a holding member for a fly hook, connected with the revolving base pivotally to adjust a tying position of the hook and
   a holding member connected to the revolving base by two movable pairs of connecting plates and a movable axle bar, which is connected pivotally with the holding member.

2. The vice for fly tying according to claim 1 wherein the maintaining base is provided with a fastening screw on its side surface to fix the axle bar of the revolving knob.

3. The vice for fly tying according to claim 1 wherein the revolving base is provided with a pin hole for centering the fly hook on its front surface.

4. The vice for fly tying according to claim 1 wherein the holding member comprises an axial holding piece made of magnetic inductive material having a magnet, and a movable holding piece, both pieces provided with a spring on their facing surfaces, a rubber ring wound at a central portion of the holding member, two screws for adjustment of the holding of the fly hook between a front portion of the axial holding and movable holding pieces, and a connecting axle bar for linking of the two pairs of the movable plates, attached at its rear end portion of the holding member with a bolt tightening cap.

5. The vice for fly tying according to claim 4 wherein a pair of magnets, is respectively face each other with the same magnet pole surface between the both surfaces of the axial holding piece and the movable holding piece.

6. The vice for tying according to claim 1 wherein the revolving base is provided with a holding coil for the provisional holding of a thread, materials, etc.

7. The vice for fly tying according to claim 1 wherein the holding member comprises an axial holding piece made of magnetic inductive material having a magnet, and a movable holding piece, both pieces provided with a spring on their facing surfaces.

8. The vice for fly tying according to claim 7 wherein a pair of magnets, is respectively face each other with the same magnet pole surface between the both surfaces of the axial holding piece and the movable holding piece.

9. A vice for fly tying comprising:
   a maintaining base supported on an upper end of a support attached on a base, the support being vertically adjustable with respect to the base;
   a revolving knob attached rotatively at a rear end of the maintaining base;
   a secondary knob provided rotatively at the rear end of the maintaining base;
   a revolving base attached rotatively at a front end of the maintaining base and connected with the revolving knob, through a hole in the maintaining base and by an axle bar of the revolving knob;
   a holding member for a fly hook, connected with the revolving base pivotally to adjust a tying position of the hook; and
   the revolving base is provided with a pin hole for centering the fly hook on its front surface.

10. The vice for tying according to claim 9 wherein the revolving base is provided with a holding coil for the provisional holding of a thread, materials, etc.

11. The vice for fly tying according to claim 9 wherein the revolving base connects with holding member by two movable pairs of connecting plates and a movable axle bar, which is connected pivotally with the holding member.

12. The vice for fly tying according to claim 9 wherein the holding member comprises an axial holding piece made of magnetic inductive material having a magnet, and a movable holding piece, both pieces provided with a spring on their facing surfaces.

13. The vice for fly tying according to claim 12 wherein a pair of magnets, is respectively face each other with the same magnet pole surface between the both surfaces of the axial holding piece and the movable holding piece.

14. A vice for fly tying comprising:
   a maintaining base supported on an upper end of a support attached on a suitable base, the support being vertically adjustable with respect to the base;
   a revolving knob attached rotatively at a rear end of the maintaining base;
   a secondary knob provided rotatively at the rear end of the maintaining base;
   a revolving base attached rotatively at a front end of the maintaining base and connected with the revolving knob, through a hole in the maintaining base and by an axle bar of the revolving knob;
   a holding member for a fly hook, connected with the revolving base pivotally to adjust a tying position of the hook; and
   the holding member comprises an axial holding piece made of magnetic inductive material having a magnet, and a movable holding piece, both pieces provided with a spring on their facing surfaces.

15. The vice for fly tying according to claim 14 wherein a pair of magnets, is respectively face each other with the same magnet pole surface between the both surfaces of the axial holding piece and the movable holding piece.

16. The vice for tying according to claim 14 wherein the revolving base is provided with a holding coil for the provisional holding of a thread, materials, etc.

17. The vice for fly tying according to claim 14 wherein the revolving base connects with holding member by two movable pairs of connecting plates and a movable axle bar, which is connected pivotally with the holding member.

18. The vice for fly tying according to claim 14 wherein the revolving base is provided with a pin hole for centering the fly hook on its front surface.

* * * * *